United States Patent [19]

Bech

[11] Patent Number: 4,649,307
[45] Date of Patent: Mar. 10, 1987

[54] INDUCTION-TYPE PLANETARY REDUCING COUPLING FOR VERY HIGH SPEED ROTATING MACHINES

[76] Inventor: Jean A. Bech, 391, rue d'Endoume, 13007 Marseille, France

[21] Appl. No.: 719,878

[22] Filed: Apr. 4, 1985

[30] Foreign Application Priority Data

Apr. 12, 1984 [FR] France .................. 84 05954

[51] Int. Cl.$^4$ ............... H02K 7/00; H02K 49/02
[52] U.S. Cl. .................. 310/99; 74/797; 74/DIG. 4; 192/84 AB; 310/83
[58] Field of Search ............ 60/39.33; 74/750 R, 74/797, DIG. 4; 310/92, 99, 76, 77, 78, 102 R, 102 A, 103, 83, 90

[56] References Cited

U.S. PATENT DOCUMENTS

| | | | |
|---|---|---|---|
| 1,817,660 | 8/1931 | Winther et al. | 310/99 |
| 2,174,662 | 10/1939 | Josephs | 310/99 |
| 2,544,360 | 3/1951 | Schmidt | 74/DIG. 4 |
| 2,548,373 | 4/1951 | Hurvitz | 74/DIG. 4 |
| 2,559,299 | 7/1951 | Helling | 74/797 |
| 2,605,876 | 8/1952 | Becker | 74/DIG. 4 |
| 3,115,794 | 12/1963 | Morin | 74/797 |
| 3,830,056 | 8/1974 | Willis, Jr. et al. | 60/39.33 |
| 4,126,060 | 11/1978 | Rineer | 74/750 R |

FOREIGN PATENT DOCUMENTS

| | | |
|---|---|---|
| 461935 | 6/1925 | Fed. Rep. of Germany . |
| 1394901 | 3/1965 | France . |
| 296768 | 12/1950 | Switzerland . |

*Primary Examiner*—Patrick R. Salce
*Assistant Examiner*—D. L. Rebsch
*Attorney, Agent, or Firm*—Balogh, Osann, Kramer, Dvorak, Genova & Traub

[57] ABSTRACT

In this gearless, induction-type planetary reducing coupling, electric currents induced in the collars of the driving rotor react with the inductive magnetic field carried by the self-excited planet wheels causing the planet wheel hubs to roll along circular tracks. Skidding is prevented by similar electromagnetic interaction in other, stationary rings. Said rolling action drives planet wheel carriers attached to the output shaft, effecting a power take-off with speed reduction from a very high rotational speed. The device is thus suitable for miniature turbines, whether driven by gas or steam, operating too fast for mechanical gear trains, and can be used to manufacture low-cost turbomotors and turbogenerators, for example using existing turboblowers converted into gas turbines by adding a combustion chamber and burner; this coupling, being reversible, serves as the starter therein.

11 Claims, 19 Drawing Figures

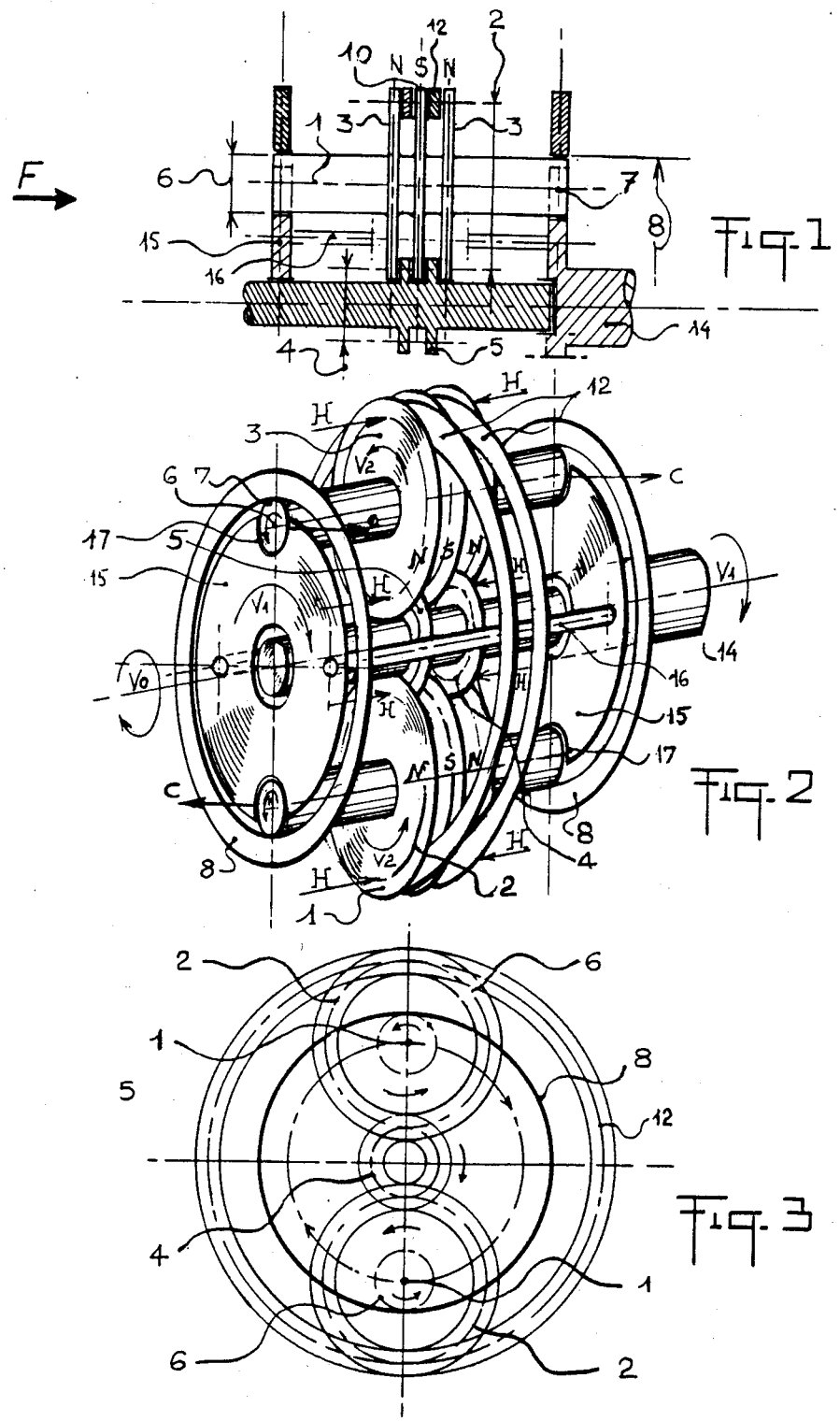

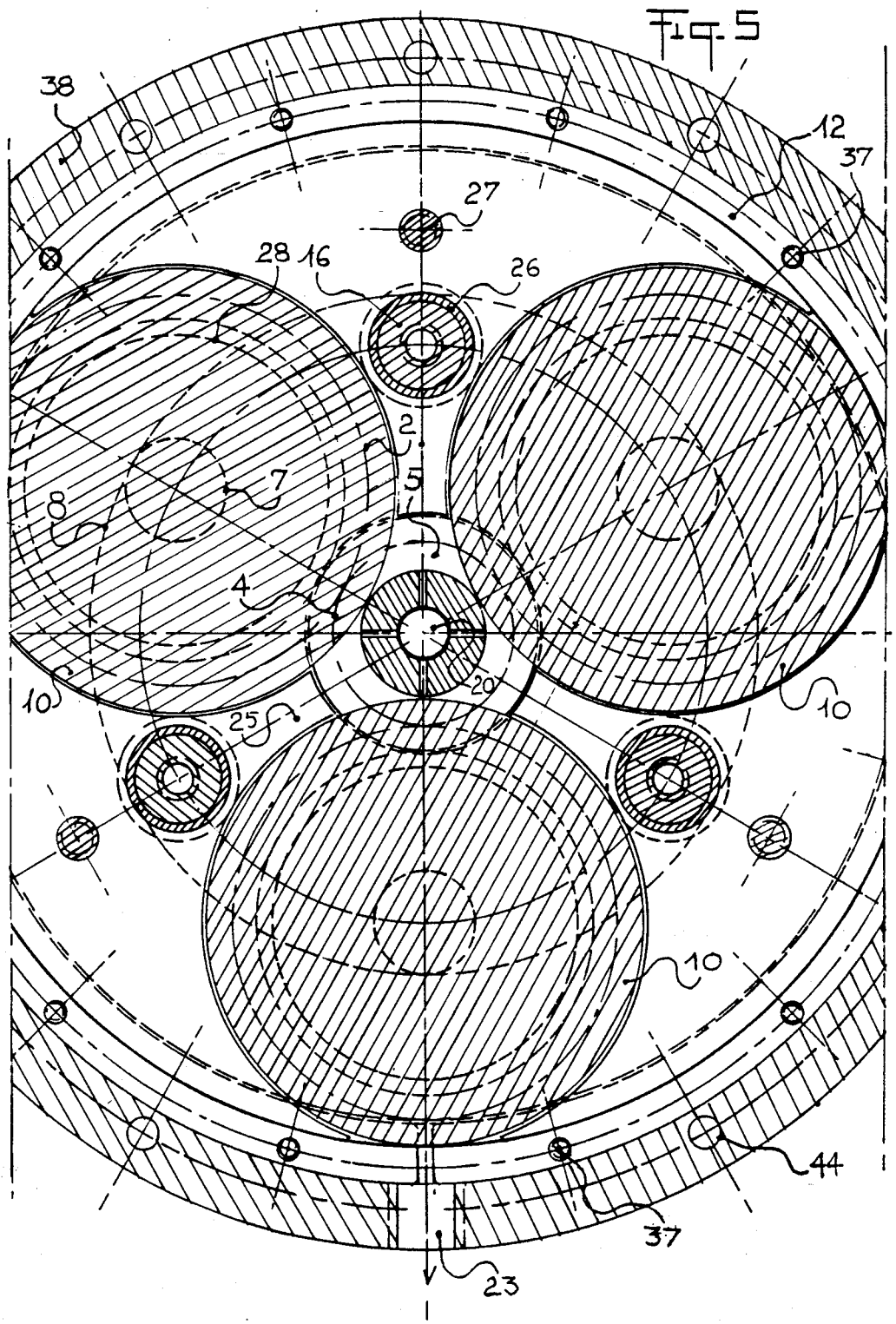

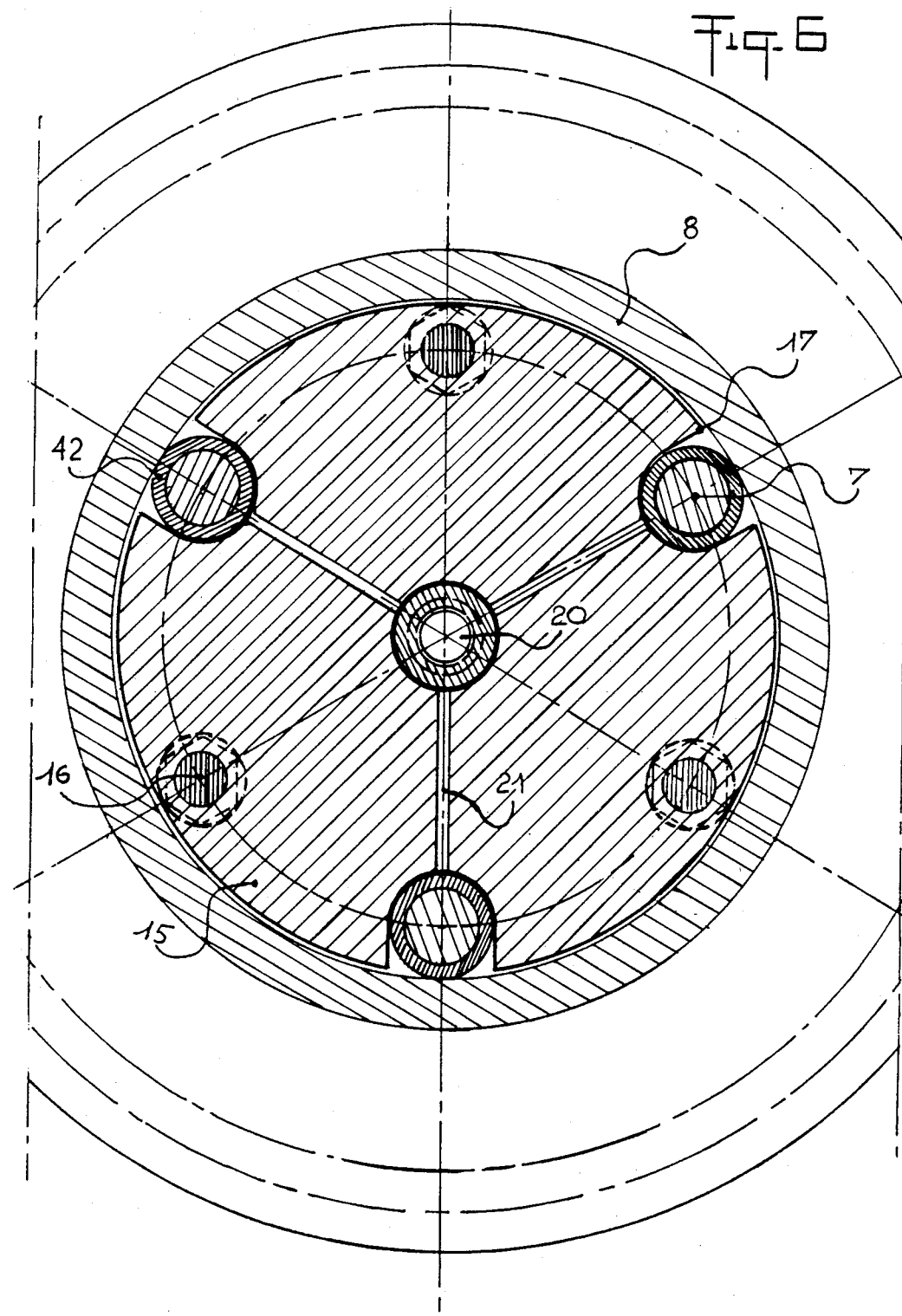

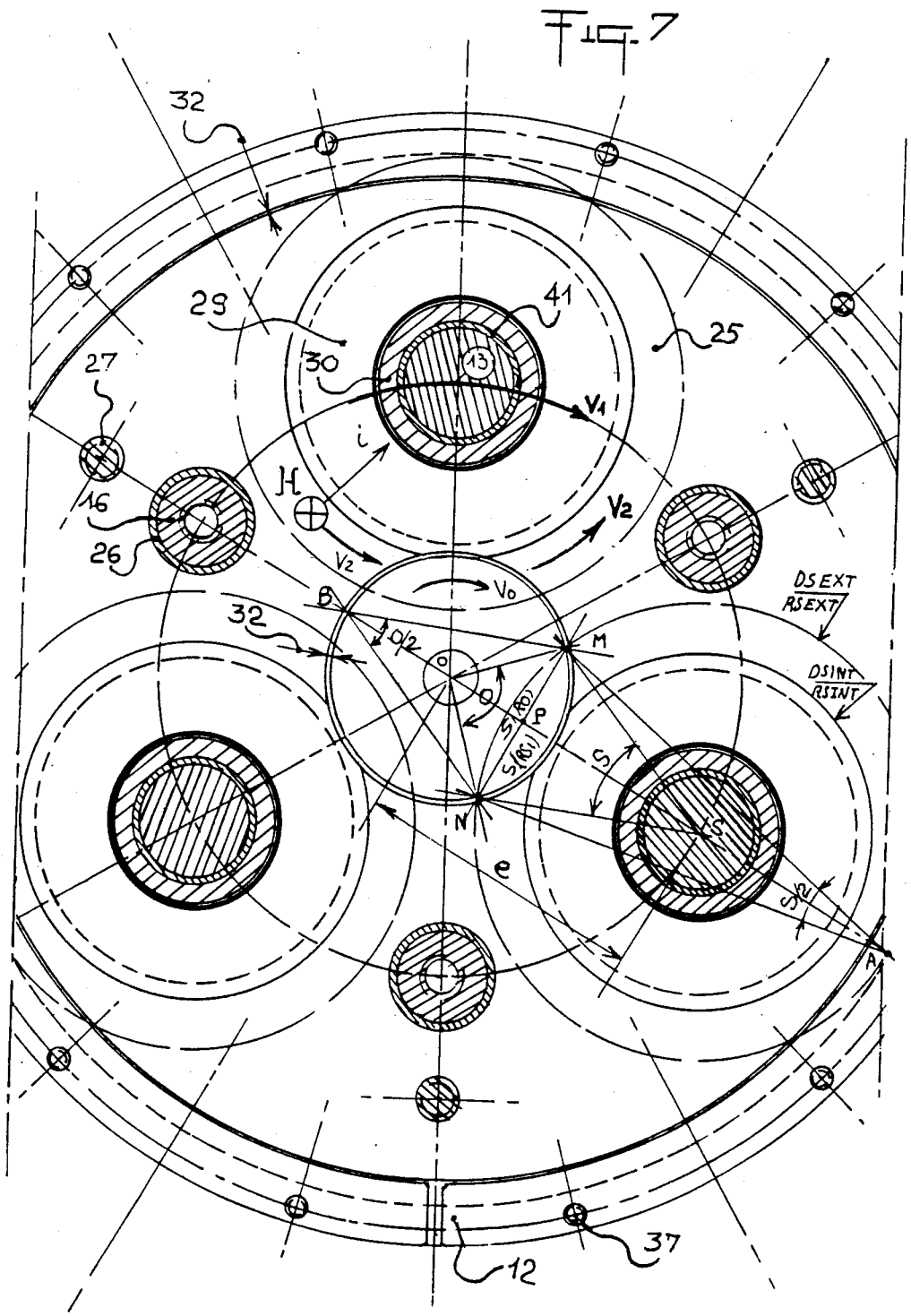

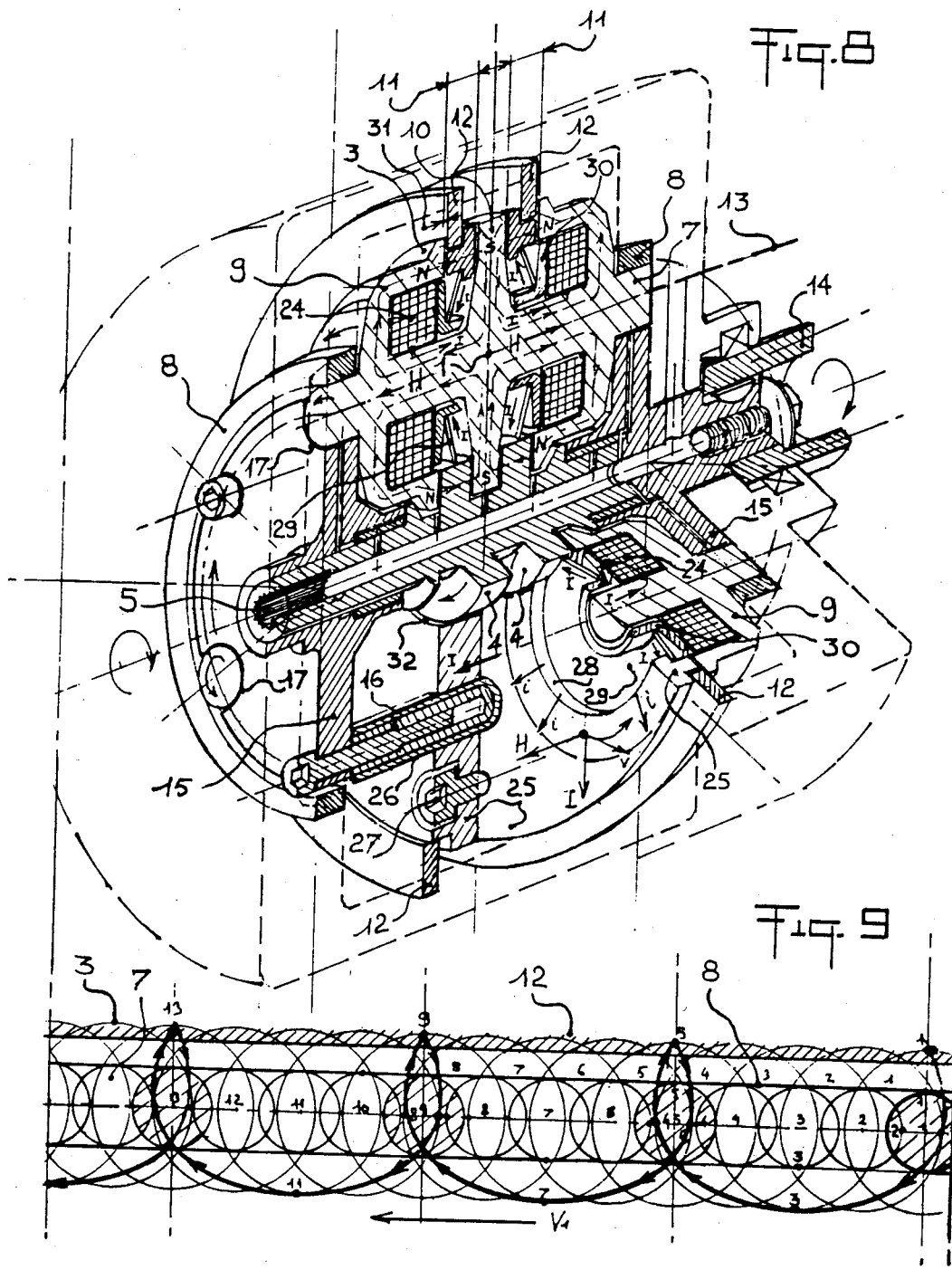

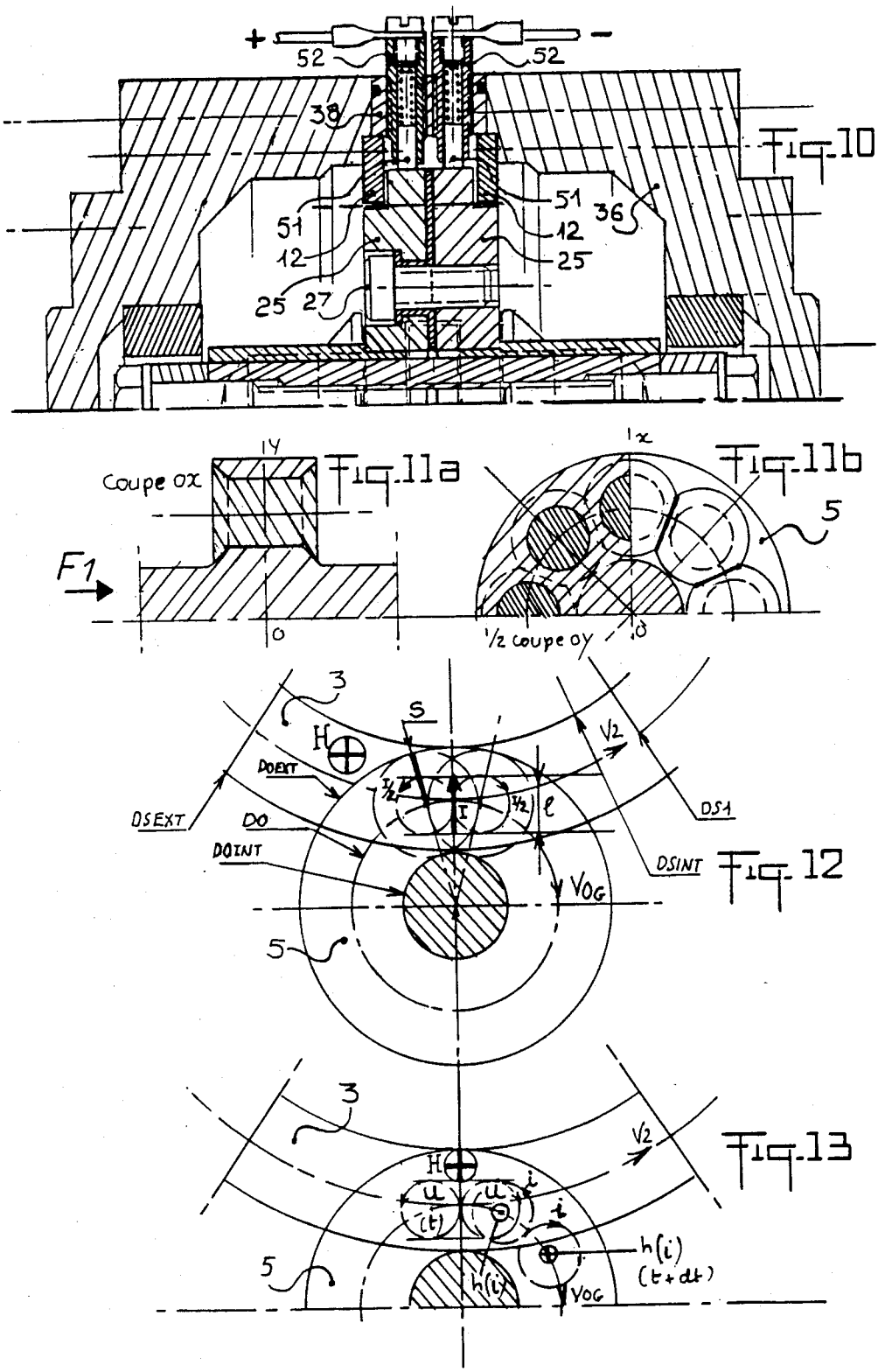

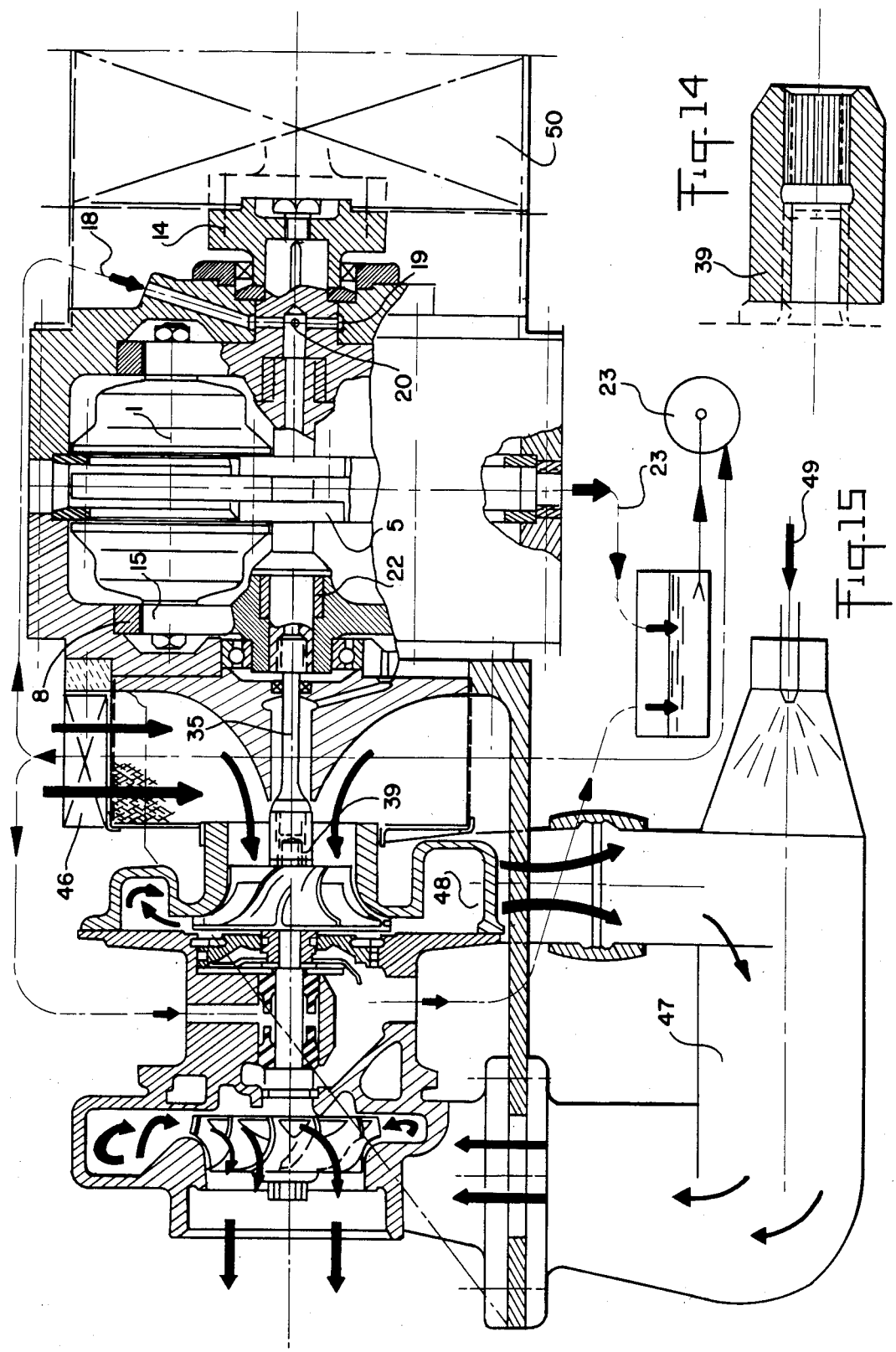

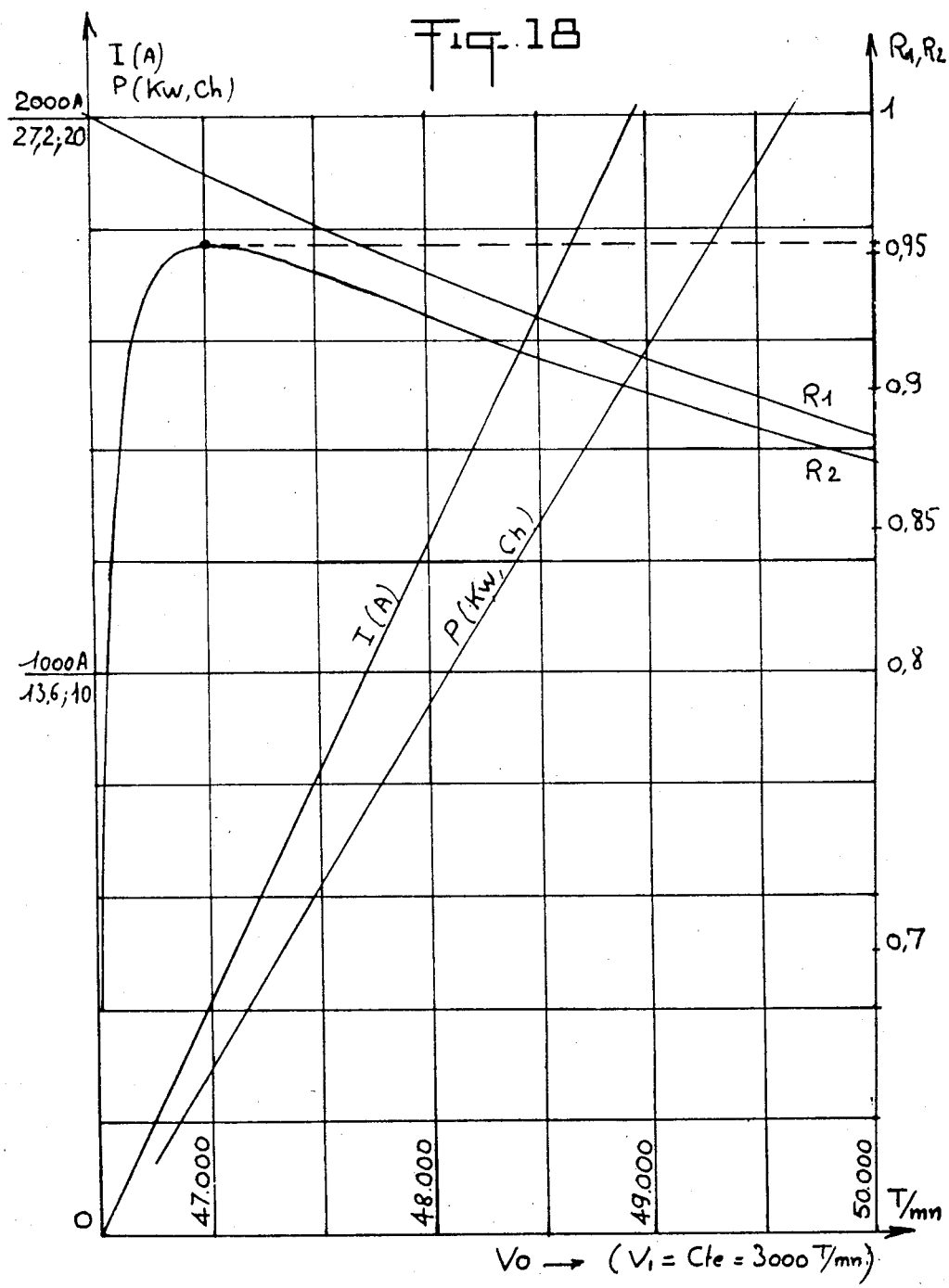

INDUCTION-TYPE PLANETARY REDUCING COUPLING FOR VERY HIGH SPEED ROTATING MACHINES

This invention relates to an induction-type planetary reducing coupling for very high speed rotating machines.

It concerns the technical field of tapping the mechanical energy produced by a prime mover, especially one the output shaft whereof is imparted a very fast rotational speed on the order of several tens of thousands of revolutions per minute. The machines concerned are typically steam or gas turbines, which, in order to operate efficiently, must be operated at peripheral speeds approximating the velocity at which the gaseous fluid expanded therein is ejected. This generally entails very high rotational speeds, as the exhaust velocity is determined by the degree of expansion obtained within the turbine section under consideration and thus by the upstream-to-downstream pressure drop or heat drop. This exhaust velocity is thus greater for greater operating efficiencies and is often several hundred meters per second.

The approach adopted in the prior art to reconcile this high exhaust speed requirement with more moderate rotational speeds consists in first dividing the expansion into a certain number of stages. Nevertheless, although the exhaust velocity is substantially reduced in this way, it is still on the order of a hundred meters or more per second. Accordingly, a further contrivance has been required, consisting in providing a rather large-diameter turbine blade wheel to obtain both the desired peripheral speed and the sufficiently low rpm required at the shaft for existing mechanical energy take-off means.

This approach has resulted in relatively heavy, bulky machines whose top speed is limited to 10,000 rpm—the highest speed at which reduction gearing, hydraulic clutches, rotating field electric linkages or any of these in combination can still be used.

Indeed, beyond this threshold, due to the linear velocities attained at the rim of the driving wheel, mechanical gear couplings can no longer be envisaged, their operating range being largely exceeded. At such speeds, even if it is still possible to suitably lubricate journal and thrust bearings, it is no longer possible to lubricate the gear teeth. For the same reasons, further complicated by hydrodynamic and constructional considerations, hydraulic clutches as well as electrical transmissions using an alternator and an asynchronous motor must also be excluded. Yet, despite the very great centrifugal forces obtaining, the constructional problems associated with compact, higher speed turbines are no greater than those associated with conventional turbines. In fact, the same magnitude of centrifugal stresses must be taken into account in designing the latters' multiple large-diameter wheels with peripherally attached blades as with the former, while the former can be built with a monobloc or even a single-stage shell to provide the same expansion. Given the current state-of-the-art in coupling and speed reducing technology, the use of small, very high speed turbines to drive limited rpm machines cannot therefore be envisaged.

What is required is a reducing coupling with a satisfactory efficiency, operable to:
 capture the mechanical energy available from a shaft rotating at very high speed;
 step down this speed to a level low enough to drive any conventional load;
 and adapt to the turbine without adversely affecting its rotor, such as due to axial thrusts or unbalanced radial stresses.

It is the object of the invention to provide a reducing coupling meeting the above-stated specification.

Accordingly, the invention provides a reducing coupling of the induction type for very high speed rotating machines, wherein the gear teeth of the classical planetary reduction gear train from which it is derived are replaced by electromagnetic induction and mechanical bearing effects obtained from a driving rotor having at least one collar, via planet wheels carrying a magnetic field generating induced currents therein, which by reacting with said inductive field bring about, with a certain amount of slipping, the rotational entrainment of said planet wheels, said latter wheels then being forced to roll without slippage along circular tracks arranged concentrically about the driving rotor via their bearing hubs applied thereto by centrifugal force; the resulting motion is picked up by the flanges of a planet wheel cage and is transmitted to the output shaft attached thereto, thus providing an effective speed reduction ratio equal to the theoretical ratio augmented by the required slipping allowance. The coupling according to the invention further comprises at least one annulus consisting of a retractable segment, said annulus being located in the air gap between the planet wheels such as to also be a center of induced currents opposing the rotational movement of the planet wheels in the event of slippage of the hubs on the tracks, thus providing a latent magnetic tooth operable to assist the mechanical rolling effect in transmitting the taped torque when required.

In one embodiment of the invention, said planet wheels consist of an axial body with two bearing hubs and a center disk therebetween forming the common pole of two distinct magnetic circuits; each of said circuits consisting of a bell-shaped frame attached to said axial body, clamped thereto by means of an attached annular raceway, a compartment whereof receives either an annular permanent magnet or a field coil, and possibly an extra annular permanent magnet on the rotational shaft thereof, said latter two magnetic circuits closing at the collars of the driving rotor, on the one hand, and at a generating ring on the other hand, said collars and generating ring being both made of either magnetic or nonmagnetic metal, or metal magnetized by inserting ferrous cores into the areas affected by the field. Said planet wheels obtain their magnetic field from induction coils the DC excitation current for which is provided by the machine itself, in the form of induced DC voltage generated by the self-rotation of said planet wheels inside their own bell-shaped magnetic frames, said DC voltage resulting from the relative motion within said frames of the magnetic field which is kept stationary, in spite of their rotation, in the fixed plane containing the collars of the driving rotor, due to the permeability effect of their metal establishing the electric current from the frames, which are insulated from their core, and the coils. Such an arrangement avoids the use of a rotating contact system.

In another embodiment of the invention, the planet wheels' magnetic field is provided by induction coils the DC excitation current for which is provided by the machine itself, said current coming from the induced DC voltage generated by the self-rotation of said planet wheels within two generating rings, and said induced DC voltage is set up by the rotation of the evenly distributed field between the two pole flanges occurring in the generating rings, said current being collected by means of a rotating contact system consisting of non-magnetic spring washers pressing against insulated bushings connected to either the + or the − leads of the coils—the other lead being grounded—to close the circuit. The two rings supported by tie rods which are electrically insulated from ground by their bushings and rotatively driven with the planet wheel cage at the reduced speed of the output shaft are short circuited in normal operation either by their mutual bearing surfaces or by switchable external brushes, said rings in the latter case being not in contact with one another, but instead isolated from one another, and said brushes rubbing on their periphery serving to power the coils from an outside DC source. Given the reversibility inherent to electrical machines, the latter arrangement makes it possible to use the reducing coupling of the invention as a starter.

The bearing hubs of the above-mentioned planet wheels swivel in notches provided in the end flanges, said notches opening towards the rolling track such that the bearing thus formed, whilst transmitting the tangential force of the output torque, is freed from the very large stress from the centrifugal force, which stress is entirely withstood by said rolling track.

The reducing coupling according to the invention, all of whose rotating parts are lubricated and cooled by a pump-circulated lubricating and cooling fluid, further comprises a distributing-bearing that introduces said fluid, via radial channels provided therefor in the output-shaft-side flange hub, into an axial bore in the high speed driving rotor, in order to make use of centrifugal force to project the lubricant through radial ducts to the journal bearings, thrust bearings, various ducts air gaps, bearing hubs and rolling tracks at a high pressure and flow rate.

The driving rotor is supported by two bearings, one of which is provided in each of the flanges, said bearings also serving as supports for the two thrust collars and being of the sliding plain type typical of the bearing technology used in the small turboblowers of internal combustion engines to rotate at turbocharger velocity.

Said reducing coupling can be coupled to a mini or a microturbine via a relatively small-diameter transmission shaft with splined ends and a special power take-off nut, thus providing a very lightweight sliding transmission, such that any adverse centrifugal or axial stresses likely to affect the rotors of the turbine and the reducer are kept to permissible values.

Said reducing coupling finds particular application in a turbocharger for internal combustion engines being utilized as a gas driven turbine, equipped with combustion chambers with burners receiving the air outflow from the blower and the liquid or gaseous fuel controlled by a regulator, according to which the greatly heated air mixed with the combustion gas expands in the turbine achieving the classical heat recovery hot air cycle wherein some of the recovered heat comes from the joule effect in the reducing coupling, adding a second, mechanical reduction gear train, as required, at the output, thus serving as the coupling from said mini or micro-turbine as well as the drive motor for a load of any type, such as an electricity generator or driving wheel or propeller motor.

As a mechanical energy transmission system, this induction-type reducing coupling can be adapted to all types of very high speed prime movers, including gas or steam turbines.

Conversely, it can also serve as a speed multiplier after any low speed motor to drive high speed rotating loads such as a centrifuge or a turbocompressor for mechanical recompression of steam (energy savings).

The present invention also finds application in a turbo-supercharger of current technology for internal combustion engines, where it makes possible small, compact and lightweight, low-cost gas turbines.

There are in fact a large number of turbocompressor designs operating at 20,000 to 50,000 rpm or more (up to 130,000 rpm) seeing ever more widespread use today due to the growing popularity of turbo-charged internal combustion engines.

As previously mentioned, there is no way at present to harness the motive power available from the output shaft of such a machine to enable it to be utilized as a motor.

The reducing coupling according to the invention meets this need.

The invention thus also enables an existing turbocharger to work as a mini- or micro-gas-turbine (see FIG. 15). This turbomotor, which is adaptable for use with various fuels and whose output shaft rotates at a considerably reduced speed, can drive a wide range of machines, including, for example, an alternator rotating at 3,000 rpm.

It is in fact possible to complete the system with a centrifugal governor mounted on the output shaft in order to control the fuel supply to the burner in the combustion chamber, said chamber receiving the air output from a compressor. The combustion air being taken from the compressor output during combustion, the greatly heated excess air, mixed with the exhaust gas, expands in the turbine, thus achieving a classical hot-air turbine continuous cycle (ideal Joule cycle).

Moreover, the inherent reversibility of the electromagnetic machine involved in this reducing coupling, gives it the capability to serve as a cranking motor for said gas turbine. Accordingly, as the oil pump—which may be separate or coupled—provides prelubrification of the bearings, the compressor flushes the combustion chambers, thus eliminating the risks of explosion on firing.

These, as well as other features and advantages of the invention will be more readily understood in reading the following detailed description of a selected embodiment, with reference to the appended drawings in which:

FIG. 1 is a partial cross-sectional diagram of the device according to the invention;

FIG. 2 is a schematic drawing, in perspective, of the said device showing its principle of operation;

FIG. 3 is a view of the device as seen from F in FIG. 1;

FIG. 5 is a transverse cross section taken along line V—V of FIG. 4;

FIG. 6 is a transverse cross section taken along line VI—VI of FIG. 4;

FIG. 7 is a transverse cross section taken along line VII—VII of FIG. 4;

FIG. 8 is a perspective and cross-sectional view showing the arrangement of the components making up the device according to the invention;

FIG. 9 is an evolutionary diagram showing the epicycloidal trajectories of the planet wheel peripheries;

FIG. 10 is a half longitudinal cross section showing one way of electrically powering the device of the invention from an outside source;

FIG. 11a is a longitudinal cross sectional view of the light alloy driving rotor and its magnet steel core;

FIG. 11b is a view of the rotor of FIG. 11a, as seen from F1 of the same figure;

FIG. 12 is a schematic diagram illustrating the active zones of the driving rotor and of a planet wheel, showing the operation of the magnetic field and the circulation of the induced currents in the rotor;

Figure 16:
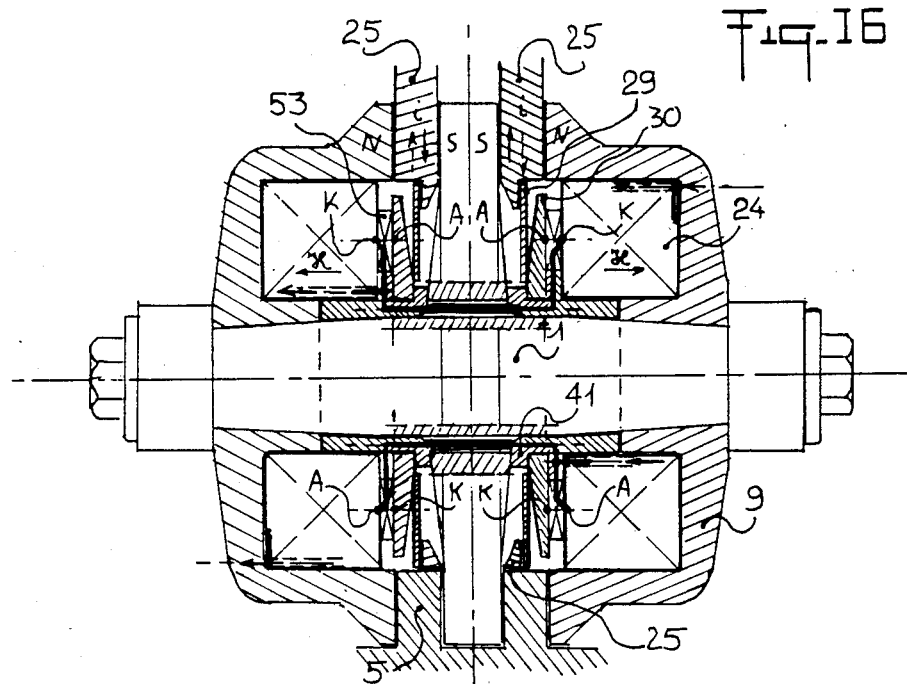
Figure 17:
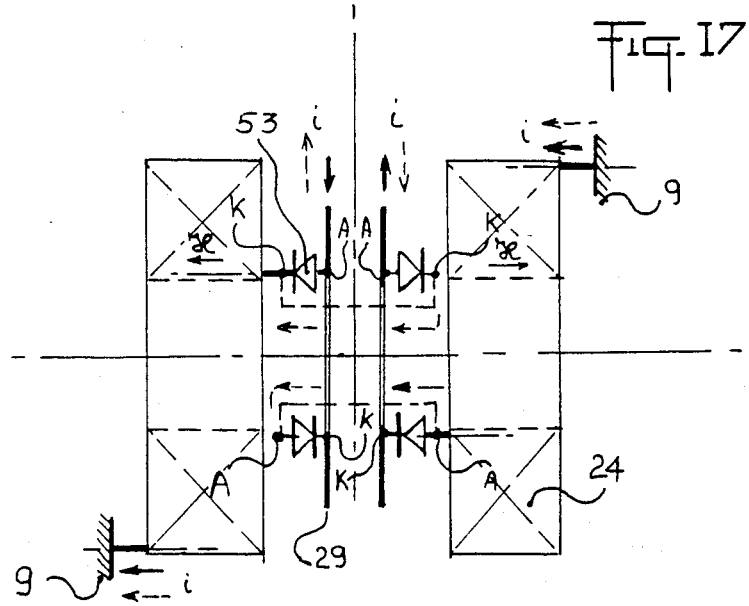

FIG. 13 diagrams the offset occurring at high speed between the current and the induced field (magnetic levitation effect);

FIG. 14 is a longitudinal cross section of the special power take-off nut on the turbine of FIG. 15;

FIG. 15 is a longitudinal cross section of a unit illustrating an application of the device according to the invention to a turbogenerator;

FIG. 16 is a longitudinal cross section of a planet wheel showing the arrangement of a diode rectifier bridge;

FIG. 17 is the circuit diagram of the device illustrated in FIG. 16;

and FIG. 18 is a graph giving the power, induced current and performance curves of the device according to the invention for a machine rated at about 25 kW.

Referring to FIGS. 1, 2 and 3, the basic configuration of the device according to the invention is that of a classical planetary gear train speed reducer, whose various wheels have lost their teeth and been reduced to their pitch diameter. Being of the planetary type, this reduction gearing includes a certain number of planet wheels 1 having two root circumferences as follows:

one, being a larger diameter 2, is contained in a disk referred to hereinafter as the pole flange 3. It is tangent to root circle 4, carried by a collar on the driving rotor 5;

the other 6 is smaller and corresponds to the outside diameter of the bearing hub 7 through which the two ends of the planet wheel press against an annulus concentric with the driving rotor and called the rolling track 8.

These hubs 6 and rolling tracks 8 are the two other root circles which, together with the tangential circles 2 and 4 of the planet wheel and the collar respectively, determine the theoretical reduction ratio (ratio of the product of the driven circle to the product of the driving circles). Each planet wheel consists of two indentical bell-shaped frames 9 (FIG. 4) joined to a central body with a center disk 10. Thus, each of them comprises four faces or pole flanges 3, attached to the hub 7 and separated by two gaps 11 wherein extends a magnetic field, with said center disk 10 forming a common pole. The flanges thus alternatingly possess a north-south and a south-north magnetic polarity or the reverse, said magnetic field being evenly distributed throughout said surfaces. Each gap 11 between two pole flanges 3 is partially filled by one of the two collars 5 of the driving rotor, said rotor thus being locally traversed in an axial direction by the magnetic field.

The rotor's high-speed rotation in this air gap develops induced currents in the metal of the collars 5.

In keeping with the laws of magnetism, said currents oppose the cause which created them, i.e., the rotation of the driving rotor. They thus react on the induction field and entrain it with them, causing its rotational movement to be transmitted to the planet wheels 1 just as if there were a meshing of gears, except with some unavoidable relative slipping. This spinning of the planet wheels 1 forces the hubs 7 to roll along the circular tracks 8 concentric to the driving rotor 5; the planet wheels' shafts 13 are driven by their rolling on said tracks 8 into a circular motion which is picked up and transmitted to the reducer's output shaft 14 by another concentric element, the planet wheel cage. The latter cage consists of two flanges 15 connected by tie rods 16 going through the space remaining between the planet wheels. One of these flanges is attached to the output shaft 14, to which it transmits the overall movement. Each of the flanges is located in the same plane as one of the two rolling tracks 8 and is provided with U-shaped notches 17 (FIG. 6) opening towards the outside, facing the track 8. These notches receive the planet wheel bearing hubs 7 which, in bearing against the face of the notch corresponding to the direction of rotation, transmit the tangential force of the output torque, with a certain amount of friction, as would be the case in a bearing. However, in this case, the bearing, being open at the periphery, avoids the very great stress from the centrifugal force acting upon each of the planet wheels. Indeed, the weight applied by said wheels to the hubs 7 is entirely withstood by the two rolling tracks 8.

Centrifugal force thus applies the hubs 7 to the rolling tracks 8 in proportion to the radius of the track, the square of the angular velocity and the mass of the planet wheel. This force is obviously considerable and the rolling action, even at relatively low speeds, is so strongly impressed that it takes place without any relative motion between the surfaces involved. Here again, the system operates as though there were a meshing of gears, only without slippage.

Nevertheless, at startup (and therefore long before centrifugal force becomes truly effective) an inductive effect similar to that occurring at the center in the driving rotor 5 is set up at the periphery of the device, this time in two other, stationary peripheral rings 12 partially filling the gap 11 between the pole flanges 3 diametrically across from the collar on the driving rotor 5. Said fixed rings 12 are designed to prevent any skidding as might occur as the planet wheel 1 is set into motion along the rolling track 8. As soon as the pole flanges 3 begin to rotate, induced currents are set up in said fixed rings 12 which tend to oppose such rotation, yielding still another meshing effect to enhance system breakaway. As it happens, said electromagnetic action achieves maximum efficiency only in the event skidding occurs on the rolling tracks 8. This is due to the fact that the trajectory of any given point on the root circle of the flange 3 and through which passes a line of force of the magnetic field changes form as soon as the planet wheel 1 begins to roll. If the wheel 1 does not roll, but skids, the trajectory is a circle. The induced current then follows a radial direction and consequently acts upon the (axial) field through a tangential force opposing the rotation — whence the desired meshing effect.

Yet as soon as it begins to roll, the trajectory of the given point, being a vehicle for a line of force, becomes epicycloidal (as plotted in FIG. 9). This line of force is cut by the ring 12 only during the initial and final portions of the successive epicycloidal trajectories, in virtually radial directions. Consequently, the induced current shifts gradually from a radial sense at the start to a tangential sense and the meshing effect tends to disappear. Two small oppositely directed tangential components nevertheless remain near the reversing point, which cancel out only in the absence of skidding and with a time lag. Said meshing effect therefore remains in potential and is instantly reinforced at the slightest imbalance. But there is also an adverse radial effect comparable to the obstruction of gear roots in mechanical gearing by a viscous substance, alternately hindering the penetration and the retraction of a gear tooth. This loss can be kept to a minimum by giving said rings 12 an inside diameter just small enough to ensure skid-free starting but such that the small tangential component will not be excessively diminished. This is why, as appears in the drawings, each ring 12 concerns only haf the breadth of the pole flange 3. In this way, the mechanical rolling effect is not alone in transmitting torque. It is helped by a latent magnetic tooth.

It is necessary to lubricate the U-shaped bearing notches for the planet wheel hubs. Although these should not skid and are made of treated special cemented steel, they are in the same situation as heavily loaded cylindrical roller bearings requiring abundant lubrication. In effect, these rests 17 benefit from the lubrication provided for the bearing hubs 7 and the rolling tracks 8. All three are easily lubricated by centrifugal force projecting the lubricant out of center bore 20. Said bore is supplied from the discharge channel 18 of a cooling grease pump 45 (FIG. 15) by a distributor 19 turning at the reduced speed of the output shaft 14. At this relatively moderate speed, a pressure of just a few bars is enough to overcome the centrifugal force preventing the flow of lubricant toward the center. (This would not hold true if the distributor were located on the driving rotor, rotating at very high speed.) The lubricant is thus introduced through the center bore 20 in the driving rotor 5 and the latter acts as a centrifugal pump, forcing it out through radial channels to ducts 21 and bearings 22.

At the end of the circuit, the lubricant is collected from the bottom trough of the three-part casing 36 and 38, by the pump return duct 23. The lubricant in fact, besides its main role, also serves to channel out Joule effect heating, the latter being the greater for greater amounts of slipping. Accordingly, a substantial flow may be required and center bore 20 must be given a generous flow section. Radial ducts are also provided in front of the collars 5, as well as in the middle of the rotor, to enhance cooling and limit the consequences of accidental rubbing between any rotating parts. This heat can be dissipated by a radiator 46.

The rotating distributor 19, due to the small clearances it requires, can in effect be the journal bearing and thrust bearing for the output flange 15 and thus serve as the snug-bearing for the unit as a whole, from which the expansions take place. The bearing supporting the output shaft 14 is therefore optional. At the power input end, this channel is plugged by the sliding end fitting of the turbine coupling shaft 35. The egress of lubricant through the serrations provides lubrication both for said serrations and for the other bearing.

The planet wheels spin at a high speed. Said speed is determined by the output speed selected as well as by the respective diameters of the rolling track and the bearing hub and, depending on the case, can be between a quarter and a third of the input speed, or about 15,000 to 20,000 rpm.

Although very strict, these operating requirements are the same as for oil-lubricated cylindrical roller bearings and are thus within the range of routine industrial practice. However, it is best to size the bearings as generously as possible and to reduce their radial loading and thus the mass of the planet wheels, avoiding too large diameters and keeping the steel sections of the magnetic circuit to a strict minimum. It may thus be necessary to use aluminum wire for the induction coils.

The magnetic field can be obtained either with permanent magnets or with induction coils, located in either case in frame 9 compartment 24.

When coils are used, the system is self-exciting. Each planet wheel carries two coils 24, traversed by an induction current generated by the planet wheels' spin. The field is initially due to the remanent magnetism in the wheels' magnetic metal and is reinforced as required by annular permanent magnets 40 accommodated on hub shaft 13. This initial magnetism is required for starting and to prevent starting skids, thanks to the currents induced in the rings 12. As soon as the planet wheels begin to spin and rotatively entrain this field, induced currents are set up in two generating rings 25 located in the gap 11 between the wheel flanges, said gap being of the same width as that surrounding the driving rotor 5.

As a first example of operation, consider said two generating rings 25, clamped together by means of screws 27, and thus electrically short-circuited (an insulated setup will be described later on herein). The rings are carried and rotatively drven by the tie rods 16 and their insulating sleeves 26 so as to be insulated from the rest of the machine. They are traversed by the hubs 7, thanks to the circular cells 28 filled with a nonmagnetic spring washer 29, so as not to shunt the field. Said spring washer presses against a bush 30 which is insulated by the clamping system 41 holding the coil 24 in place. This overall assembly thus electrically connects all the planet wheel rings 30 and is moreover driven by said wheels in the same way as the planet wheel cage 15. Obviously, unlike the stationary peripheral rings 12, these generating rings 25 always cross the magnetic field lines in a circular pattern and the induced currents are radially directed throughout the circular area thus swept. The lines of force either converge at the contact circle between the spring washer 29 and bush 30 or diverge therefrom, depending upon the sense of the field. The magnetic poles in the air gaps 11 being reversed, the direction of said radial currents is also reversed from one side to the next. A constant difference of potential is thus established, for any given rpm, between the two rings 30 of the same planet wheel. These rings being insulated from the frame 9 and the planet wheel hub shaft 13, said DC voltage can thus be applied to the coils 24 by connecting said rings to the coil feed wires, the latter series circuit being closed at the hub by grounding the output leads and by the metal-to-metal contact of the two rings 25 clamped together by means of connecting screw 27.

Two, three or four planet wheels can be used in the device according to the invention, the latter being the greatest practical number as determined by geometric and constructional requirements, since the wheels must, in order to provide a large reduction ratio, have a rather large diameter compared with the driving motor 5. Beyond the design with two diametrically opposite planet wheels, the configuration enabling the largest planet wheel and the smallest rotor diameter combination is that using three planet wheels spaced 120° apart.

The latter configuration, being the one chosen as the basis of this description, is the most suitable when the turbine power take-off can be located at the end of the shaft and therefore the diameter of the driving rotor chosen freely and accordingly as small as desired or necessary. In the four-planet-wheel configuration, circumscribed within the same circle, the planet wheels will have a slightly smaller diameter and the rotor a clearly larger diameter, yielding a lesser reduction ratio. The latter arrangement may nevertheless be necessary when the diameter of the driving rotor is tied to that of its mounting shaft and can therefore not be sufficiently cut back. Using three planet wheels might then entail an impractical bulkiness and excessively heavy wheels. But the torque transmission capability with four wheels being greater than with three, the same power can be obtained with less slippage and thus with better efficiency using four wheels.

It is further permissible in this case to have recourse to a second reduction stage, if necessary, consisting of conventional mechanical gears, the final efficiency remaining acceptable (product of the ratios).

In principle, the metal used in the driving rotor 5 of the peripheral rings 12 may or may not be magnetic. Alternatively, a composite construction can be invisaged with iron cores regularly spaced in a metal such as aluminum, in a manner conversely analogous to the squirrel cage rotor of an asynchronous motor (FIG. 11).

If the metal is nonmagnetic, its opposing reluctance in the air gap 11 nearly matches that of the magnetic circuit. And this reluctance increases in proportion to the width of said gap, thus in proportion to the thickness of the collar 5, which is the same as that of the rings 12 and 25. The latter parts must therefore be kept very thin. Despite this precaution and unless very powerful magnets or very large coils traversed by a strong induction current, the field sustained in the gap 11 and traversing the driving rotor collar 5 will only induce very small currents therein whose reaction force on this weak field can develop only a very small tangential force.

If on the other hand a magnetic metal is used (in solid or composite construction), advantage is taken of the concentration of the magnetic field due to its permeability effect and the values of the electromagnetic forces attained are considerably increased. Moreover, limiting collar 5 and ring 12 and 25 thickness is not as important.

Conversely, the air gap allowance 31 required to allow rub-free rotation of the pole flanges on the collars 5 and the rings 12 and 25 shall have to be kept as small as possible due to its un-negligible reluctance and in order to limit leakage flux. Another indispensable precaution consists in avoiding variations in magnetic flux during planet wheel rotation, which might result in eddy current losses.

This risk is absent when nonmagnetic metal is used because the permeability of the medium cutting the lines of force during rotation is invariably equal to 1 (the value for a vacuum, air and non-magnetic materials).

The same can obtain with a magnetic metal, providing there is no change in the permeability of the carrying medium during rotation. Otherwise a costly and frail laminated construction would be required for the planet wheel frame. Such lamination is therefore avoided by keeping the empty spaces in the area swept by the rotational elements to a minimum. This is why, in a solid construction using soft iron or steel for example, the necessary clearance 32 between the periphery of collar 5, the center bore of the generating rings 25 and the fixed rings 12 concentric thereto must be kept to a minimum, to ensure that the lines of force of the field, while rotating, are not required to cross too broad an empty space where the permeability, dropping from a high factor of merely 1, would bring about a change in the flux and therefore cause eddy current losses.

If the rings 25 are made of non-magnetic metal, the magnetic circuit is considerably modified. It loses its uniform distribution as the magnetic flux then concentrates along the fixed diametrical plane of the planet wheel containing the driving rotor collars 5 and the fixed rings 12, in other words, in the circuit's high permeability area, where magnetic metal appears in the air gap. Under these conditions, the high speed rotation of the metal forming the bell-shaped frames 9 in this fixed-plane field would induce currents therein which, looping in the metal, would bring about large losses. Yet, if each of the bells 9 is insulated from its hub and the radially-oriented induced currents are picked up at the bells' inside periphery, a continuous potential difference is established (given the reversed polarities) exactly as described previously with respect to the generating rings 25. Thus, the induction coils can be supplied in the same way, except without the need for any rotating contact, since the electric circuit closes between coils 24 in the insulated hub 7 within the planet wheel. This embodiment of the invention is advantageous in making it possible to do away entirely with the spring washer 29 and ring 30 rotating contact system. Said rotating contacts can be kept however for the purpose of supplying the coils from an external DC power supply either for reserve power or for starting. The basic disposition is unchanged; only the type of metal used for the rings 25 need be changed as these now serve merely as conductors from the brushes 51. If need be, the magnetic flux affecting the fixed rings 12 can be reinforced and directed by means of one or more soft iron cores inserted in places in front of them within said nonmagnetic rings 25 (mixed construction).

When considering such mixed construction, especially for the driving rotor 5, the soft iron or steel cores should not be spaced too far apart. The best solution consists in using low-carbon-steel countersunk rivets with a broad head whose clinches after hammering are truly contiguous (FIG. 11).

When the collars of the driving rotor 5 and the generating rings 12 are made of magnetic metal, these elements are subjected to the pull of the planet wheels and lacking locating stops of some form, would inevitably come into mechanical contact one way or the other. To prevent this happening and maintain equal gaps between the concerned parts, the driving rotor is provided with two collars 33 able to bear with a slight amount of play against one or the other of the outside faces of the bearing brackets for bearings 22 supported by flanges 15. As for said flanges 15, whose spacing is determined by the length given to the tie rods 16, these position the planet wheels by bearing against one or the other of the faces 34 of the bell-shaped frames 9 with just the necessary play. The spacing of the generating rings 25 from the flanges 15 meanwhile is determined by the insulating sleeves 26 which can be adjusted to the desired length. Moreover, the spring washers 29 contribute to maintaining the air gap by spreading apart the frames 9 of rings 25 whose thickness ensures suitable clearance to the disks 10. It is obviously advantageous to equalize all these gaps to balance the various magnetic attractions and relieve the stops. But here various expansions must be taken into account, occurring on either side of the center line, to reduce their effects on said clearances to a minimum, the whole assembly being positioned by the locating or "tight" bearing 19.

The driving rotor can be either integral with the turbine shaft, or coupled to it (FIGS. 14 and 15).

The latter is the case for a power take-off at the end of the shaft of a turbocharger compressor in the example selected for the present description. As the reducing coupling must be located a certain distance from the compressor air intake to avoid interference, coupling is accomplished by means of a small-diameter shaft of suitable length which is elastically torsionally stressed and splined at both ends (sliding coupling). Torque is taken from the turbine shaft via a special nut 39 with a splined extension, taking the place of the original nut used to lock the compressor wheel. The driving rotor, also splined, receives the other end 35.

Thus the driving rotor, supported by its own journal and thrust bearings, as previously described, has no effect on the turbine shaft except for the slight additional weight it brings to bear on the nut on one end of shaft 35.

For safety purposes, it is best to crank gas turbines so that their compressor will have begun to operate before startup and have fanned the combustion chambers.

Such cranking can be provided by the reducing coupling by making use of the inherent reversibility of electrical machines. This can be achieved by not electrically connecting the two generating rings 25 and insulating them, as well as their screw connections 27, from each other. Under these conditions one can adapt brushes 51 with insulating supports 52 (FIG. 10) to the intermediate ring 38 so that they rub against the periphery of the two generating rings 25. Said brushes being connected together and thus short-circuited, thus enable self-excited operation of the reducing coupling as before. But if this short circuit is interrupted, it becomes possible to feed the induction coils from an external DC source. It is nevertheless necessary to keep the same direction of rotation for motor and reducing coupling operation. Whence the inclusion in each planet wheel of a four-diode 53 rectifier bridge (FIGS. 16 and 17) to keep the same planet wheel magnetic polarity while the current sense in the generating rings is necessarily reversed (motor sense). Obviously, there is no longer any need for starting magnets, said external current providing the initial magnetization and then being relayed by the self-energizing as soon as it is interrupted and the rings again short circuited.

The magnetization thus created reacts with said supply current on its radially crossing the generating rings and sets up a torque proportional to their respective intensities. If it is great enough to overcome the passive resistances and rotatively drive the planet wheels, the planet wheel cage, the output shaft and the load will be entrained. Said planet wheel rotation then sets up induced currents in the driving rotor which tend to drive the latter by their reaction with the field.

However, the torque acting on the rotor is very small, so the rotative driving of the turbine and compressor can only be obtained if their passive resistance is minimal, the work to be done by the compressor being deemed negligible, at least initially.

As long as the rotor is stopped, relative slip is at a maximum and it remains considerable throughout startup. Accordingly, the induced currents in the driving rotor can reach hazardous proportions if its rotative launching is too long delayed, especially since, as previously mentioned, both the induction current and the field must be very strong to succeed in setting the planet wheels in motion.

This is the reason why, to avoid overheating, the lubricating and cooling pump 45 must be previously working. A separate electric motor driven pump powered from the same current source as the device and accordingly pumping as soon as the starting current is supplied, appears preferable to a coupled pump necessarily fitted to the output shaft, which is the first to rotate. Indeed, the latter alternative would require a tradeoff in terms of increased starting torque for the planets which might be impractical.

As far as the requirement for very small air gap clearances is concerned, this requirement becomes less stringent as the overall dimensions of the device are increased. The calculation for a machine whose dimensions are multiplied by a factor of 1.5 shows that, while the theoretical capacity for power transmission is multiplied sevenfold under the same operating conditions, clearance "&" can increase to 0.25 mm, or 2.5 to 5 times more.

Once the parts have been made to the desired dimensions and with the required accuracy, their relative positioning and therefore the associated clearances are established by the spacing of the flanges 15 and generating rings 25 as determined by the tie rods 16 and sleeves 26. Expansions thus take place symmetrically about the center plane containing disk 19. Constructional allowances are thus affected very little by this factor, providing the driving rotor is suitably cooled and the lubricant flowing therethrough limits its lengthening while at the same time equalizing temperatures throughout the system.

The initial clearances between the external rings 12, the disks 10 and the pole flanges 3 on the other hand are established by the distributor bearing 19 located on the end of the device. They may therefore be considerably changed by heating and by cumulative expansions, so their cold-set values should take this into account. However, since the external meshing effect is of somewhat secondary importance and we wish to limit its parasitic by-product, there is no inconvenience in adopting slightly greater tolerances there, especially as these have little bearing on MMF consumption.

Looking again at the clearance between the driving rotor 5 and the flanges 3, it deserves emphasis that any contact as may occur between these rotating surfaces would be a problem only at startup or, during normal operation, with inadequate lubrication and a fairly powerful axial thrust. In fact, the relative displacement of these surfaces is associated with slip and thus involves closely related speeds in the same direction. Similarly, as can be seen from FIG. 9, the actual relative motion in the possible contact areas on the external rings 12 occurs at the lowest speed along the epicycloidal paths, near the reversing point. Furthermore, there is a magnetic self-centering effect at work (FIG. 13) due to the very high operating speeds, especially for the driving rotor 5.

The currents induced in the collars actually flow in two loops. Each loop generates a magnetic field the direction whereof is determined by the direction of the current. This direction is the same as that of the induction field in one of the loops and is opposite that of the field in the other loop, since these two currents revolve in reverse. Accordingly, at the point of tangency of the two loops, said two equal and oppositely directed fields cancel each other and have no effect on the induction field. But at very high speed there is a time lag between the creation of the induced voltage and the settling of the induced current. It follows that if the two loops corresponding to the voltage are still at the initial point of tangency between circles D0 and DS1, the two loops coresponding to the actual current tend to lag the movement (FIG. 13). Given the respective directions of the induction field, the movement and the currents, it is apparent that the loop, whose field is directed opposite the direction of the induction field, tends to move in front of the latter and to oppose it as the other leaves the action zone. A repulsion effect thus occurs between the flanges 3 and collars 5 leading to a self-centering phenomenon taking over the work of the stops 33 or at least relieving them by the same amount. This well known phenomenon, called "magnetic levitation", used in many electrical machines, can occur, albeit to a much lesser extent, between the same pole flanges 3 and the external rings 12. It is less worthwhile in this case however since the clearances are greater due to the cumulative expansions and said flanges are already suitably positioned.

Unfortunately, the levitation effect is of no use where the magnetic metal generating rings 25 are concerned because the induced currents are not allowed to loop therein. This results in a serious friction hazard between the planet wheel poles 3, 10 and the generating rings 25, the relative speed here, V2, being very high.

Indeed the magnetic attraction acting upon the surface generating the induction current can become very substantial if the air gaps or the magnetic fields are not equal (balanced). At this speed, any contact would jam and damage the machine. Thus, the insulating bushings 26 on the tie rods 16 play a crucial role, as do the limit surfaces 34 between the flanges 15 and the frame 9. But the spring washers 29, pressed against the rings 25 and 30 also play a spacing role. Providing the bearing surface and lubrication are adequate, this dual current collector or commutator system acts as a further means for locating the planet wheel relative to the rings 25. Said lubrication as a matter of fact is quite adequate, as lubricant flows out of bore 20 at the base of collar 5 and issues directly on the surface of friction between washer 29 and ring 30, abundantly spraying all the pole faces in the process.

Figure 4:
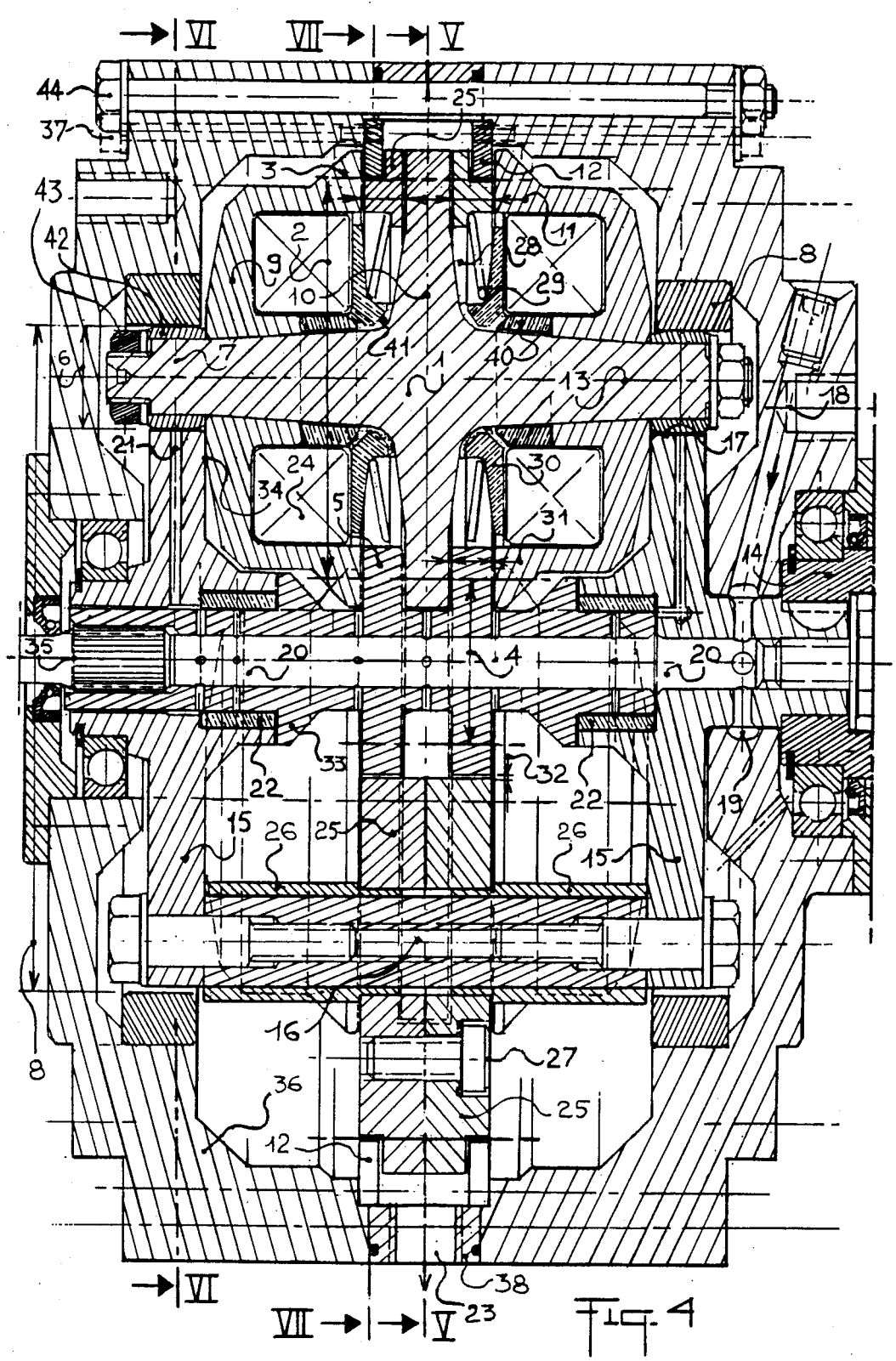
FIG. 4 is a longitudinal cross section through the center of a planet wheel.

The device's theoretical electrical performance can be evaluated from the data supplied hereinbefore and the result of a calculation for a model with dimensions approximating those of the drawing in FIG. 4 is given in graphic form in FIG. 18. The application is a speed regulated turbogenerator running at a constant speed VI=3000 rpm and driven by a turbine operating in the 46,500 to 50,000 rpm range.

The computation gives an overall theoretical efficiency curve similar to that of an asynchronous motor, peaking at 95%. With more slip, the performance curve R2 falls relatively slowly, such that efficiency at 50,000 rpm is still 87%, but with ten times the power output. This efficiency is the same as that of existing electrical transmissions or hydraulic clutches. However, since neither of the latter is suitable for the speeds involved here and neither can compare in terms of single-stage reduction capability (here mounting to 1:15.8), the utility of the invention in making practical use of very high speed, compact turbines is clearly established.

What is claimed is:

1. A speed reducing coupling of the induction type for very high speed rotating machines, wherein the gear teeth of the mechanical planetary reduction gear train are replaced by an electromagnetic induction field and mechanical bearing means comprising a driving rotor having at least one collar, planet wheels to carry a magnetic field generating induced currents therein and which react with said induction field and bring about, with a certain amount of slipping, the rotational entrainment of said planet wheels and further comprising circular tracks arranged concentrically around said driving rotor, said wheels wheels being made to roll without slippage along said circular tracks via bearing hubs applied thereto by centrifugal force, and wherein said resulting motion is picked up by pole flanges of a planet wheel cage and transmitted to the output shaft attached thereto, thus providing speed reduction in an effective ratio equal to the theoretical ratio augmented by the required slipping allowance.

2. Reducing coupling according to claim 1, further comprising at least one stationary peripheral ring means in the air gap between said planet wheels to act as a center of induced currents opposing the rotational motion of said wheels in the event of slippage by the hubs on their rolling tracks, thus providing a latent magnetic tooth operable to assist the mechanical rolling effect in transmitting the tapped torque when required.

3. Reducing coupling according to claim 2, wherein said planet wheels consist of an axial body with two bearing hubs and a center disk therebetween forming the common pole of two distinct magnetic circuits; said two circuits each consisting of a bell-shaped frame attached to said axial body, clamped thereto by means of an attached annular raceway, a compartment of which receives a magnet means, and a further annular permanent magnet on the rotational shaft thereof, said two magnetic circuits closing at the collars of the driving rotor on the one hand, and at a generating ring on the other hand, said collars and generating ring having predetermined magnetic characteristics.

4. Reducing coupling according to claim 3, wherein said planet wheels obtain their magnetic field from induction coils the DC excitation current of which is provided by the machine itself, said current coming from induced DC voltage generated by said planet wheels' spinning in their own bell-shaped magnetic frames, said voltage resulting from the relative motion within said frames of the magnetic field which is kept stationary, in spite of their rotation, in the fixed plane containing the collars of the driving rotor, due to the permeability effect of their metal establishing the electric current from the frames, which are insulated from their core, and the coils, said arrangement avoiding the use of a rotating contact system.

5. Reducing coupling according to claim 3, wherein said planet wheels obtain their magnetic field from induction coils the DC excitation current of which is provided by the machine itself, said current coming from the induced DC voltage generated by said planet wheels' spinning in two generating rings, said voltage resulting from the rotation of the evenly distributed field between two pole flanges occurring in the generating rings, said current being collected by means of a rotating contact system consisting of nonmagnetic spring washers pressing against insulated bushings connected to one of the leads of said coils and the other lead of said coils being grounded to close the circuit.

6. Reducing coupling according to claim 5, wherein said two generating rings, supported by tie rods which are electrically insulated from ground by their own bushings or sleeves and rotatively driven with said planet wheel cage at the reduced speed of the output shaft, are short circuited in normal operation either by their mutual bearing surfaces or by switchable external brushes, said rings in the latter case being not in contact with one another, but instead isolated from one another, and said brushes rubbing on their periphery serving to power the coils from an outside DC source, thus enabling, given the inherent reversibility of electrical machines, use of said reducing coupling as a starter or cranking motor.

7. Reducing coupling according to claim 3, wherein said bearing hubs of said planet wheels swivel in notches provided in the end flanges, said notches opening towards a rolling track such that the bearing thus formed, while transmitting the tangential force of the output torque, is freed from the very great stress from centrifugal force, the latter being entirely withstood by said rolling track.

8. Reducing coupling according to claim 7, comprising means for lubricating and cooling all rotating parts by a pump-circulated lubricating and cooling fluid, and further comprising a distributing bearing that introduces said fluid, via radial channels provided therefor in an output-shaft-side flange hub, into an axial bore in said high speed driving rotor, in order to make use of centrifugal force to project said lubricant through radial ducts to the journal bearings, thrust bearings, ducts, air gaps, bearing hubs and rolling tracks at a high pressure and flow rate.

9. Reducing coupling according to claim 8, wherein said driving rotor is supported on two bearings, one each in each of said end flanges, said bearings also serving as supports for two thrust collars or bearings and being of the sliding plain bearing type typical of the bearing technology used in the same turboblowers of internal combustion engines so as to be able to rotate at the same speed as the latter.

10. Reducing coupling according to claim 9, for coupling to a miniature-turbine via a relatively small-diameter transmission shaft with splined ends and a special power take-off nut, so as to form a very lightweight sliding transmission, such that any adverse centrifugal or axial stresses likely to affect the rotors of the turbine and the reducer are kept to within permissible values.

11. Reducing coupling according to claim 10, used in an internal combustion engine turbocharger as a gas-powered driving turbine and equipped with combustion chambers with a burner receiving air from the blower as well as fuel in liquid or gas form and metered by a regulator, such that the greatly heated air mixed with the combustion gas expands in the turbine achieving the classical heat recovery hot air cycle wherein some of the recovered heat comes from the Joule effect in said reducing coupling, said reducing coupling driving a second, mechanical reduction gear train, as required, and thus serving in its coupling capacity, as the driving motor means to drive any type of load, including a generator, a wheel or propeller drive, from said mini- or miniature.

* * * * *